United States Patent [19]
Felker

[11] 3,838,617
[45] Oct. 1, 1974

[54] ART OF SHEARING A HELICAL COIL
[75] Inventor: Paul J. Felker, Marchfield, Wis.
[73] Assignee: Penetred Corporation, Marshfield, Wis.
[22] Filed: Aug. 29, 1973
[21] Appl. No.: 392,604

[52] U.S. Cl............................ 83/17, 83/176, 83/566, 83/907, 83/443
[51] Int. Cl........................... B26d 23/00, B26d 7/06
[58] Field of Search......... 83/17, 20, 175, 176, 907, 83/566, 443

[56] References Cited
UNITED STATES PATENTS
3,585,887  6/1971  Gerhard et al..................... 83/907 X Primary Examiner—J. M. Meister
Attorney, Agent, or Firm—Arthur L. Morsell, Jr.

[57] ABSTRACT

A helical coil which is being fed from a forming machine at high speed, and which is being simultaneously rotated, is directed at an angle into a guide tunnel having a bore which is of substantially greater height than the diameter of the coil whereby the coil inherently engages the top of the guide tunnel. At the discharge end of the guide tunnel a retracted knife, which is disposed at the same angle as the convolutions of the coil, projects into the upper portion of the bore of the tunnel in such a position that the rotating coil is normally in threaded engagement with the lower edge of the knife to progress past the knife as the coil is being rotated and moved lineally, the knife being arranged to periodically move the coil downwardly to shear a lower convolution portion against a cooperating shearing edge at the bottom of the tunnel bore.

10 Claims, 4 Drawing Figures

PATENTED OCT 1 1974  3,838,617

ART OF SHEARING A HELICAL COIL

BACKGROUND OF THE INVENTION

1. Field of the Invention

The invention is adapted for the shearing of a helical coil which is moving at high speed and simultaneously rotating, and is particularly adapted for the purpose of shearing a continuously-moving metal coil of the type suitable for a traction-augmenting member in tires. The invention is particularly adapted for use in conjunction with the roller die coiler apparatus of my U.S. Pat. No. 3,726,784, issued June 5, 1973.

2. Description of the Prior Art

A coil which is being discharged from a high speed machine such as the roller die coiler of my prior U.S. Pat. No. 3,736,784, and which is simultaneously rotating, presents a problem when it is desired to shear the continuously-moving coil into suitable lengths for use. In coils adapted for use in the treading of tires they must be cut off at lengths substantially equal to the circumference of the mold or the tire in which they are to be used, and these lengths may vary with the size of the tire. Early attempts to shear a coil while it is moving at high speed from such a machine resulted in the knife frequently engaging the top of a convolution and causing compression and resulting deformation of the coil before it is sheared. Such a procedure is unacceptable. Shearing of a coil being delivered from a coiling machine can, of course, be accomplished by stopping the coiling machine whenever a shearing operation is to be performed. This, however, greatly slows down production and results in loss of the advantages of the high speed coiler of my U.S. Pat. No. 3,736,784. Traveling shears have been attempted but this involves costly apparatus. It was also attempted to substantially slow down the operation of the coiler to permit shearing while the coil was being continuously discharged. Such a procedure resulted in the knife sliding down on the back of a convolution to the bottom thereof to accomplish the cutting. Here the advantage of speed was lost and, in addition, the accuracy of the cut was affected because, if the knife slid down an angled convolution, the length of the cut might be altered by plus or minus one convolution. This meant that it was necessary to remeasure the cut lengths and again cut them off by hand, which was an extra operation and time consuming.

SUMMARY OF THE INVENTION

The present invention provides means for shearing a helical coil which is moving and rotating at high speed, by utilizing a guide tunnel having a bore of predetermined height dimensions with respect to the coil, the arrangement being such that the coil urges itself against the top of the guide tunnel and into threaded engagement with the shearing knife, the latter always engaging the bottom of a coil convolution so that, when a shearing stroke is made, the cut will take place without crushing to produce an accurate, clean, non-deforming cut which can be made without stopping the high speed feed movement of the coil.

A general object of the invention is to provide improved means for shearing a helical coil to predetermined lengths while the coil is continuously moving lineally and rotating at high speed.

A further object of the invention is to provide apparatus for shearing a helical coil as above described which makes use of the spring characteristics of the coil to absorb the compression which occurs while the movement of the coil is momentarily being interrupted during the cutting stroke, and wherein the spring characteristics of the coil are utilized to cause the coil to re-engage itself with the retracted shear knife so that accurate, clean, non-deforming, repetitive cutting can be accomplished.

A further object of the invention is to provide apparatus as above described which is simple and inexpensive in construction and foolproof in operation.

A further object of the invention is to provide a foolproof method of shearing helical coils which are moving lineally and which are rotating at high speed, said method including the step of causing the knife to have threaded engagement between the convolutions of the coil when the knife is retracted, so that it will always be positioned to cut on the bottom of a convolution without crushing when the cutting stroke takes place.

With the above and other objects in view, the invention consists of the improvements in the art of shearing a helical coil, and all of its parts and combinations, as set forth in the claims, and all equivalents thereof.

BRIEF DESCRIPTION OF THE DRAWINGS

In the accompanying drawing, illustrating one complete embodiment of the preferred form of the invention, in which the same reference numerals designate the same parts in all of the views.

DESCRIPTION OF THE PREFERRED EMBODIMENT

Figure 1:
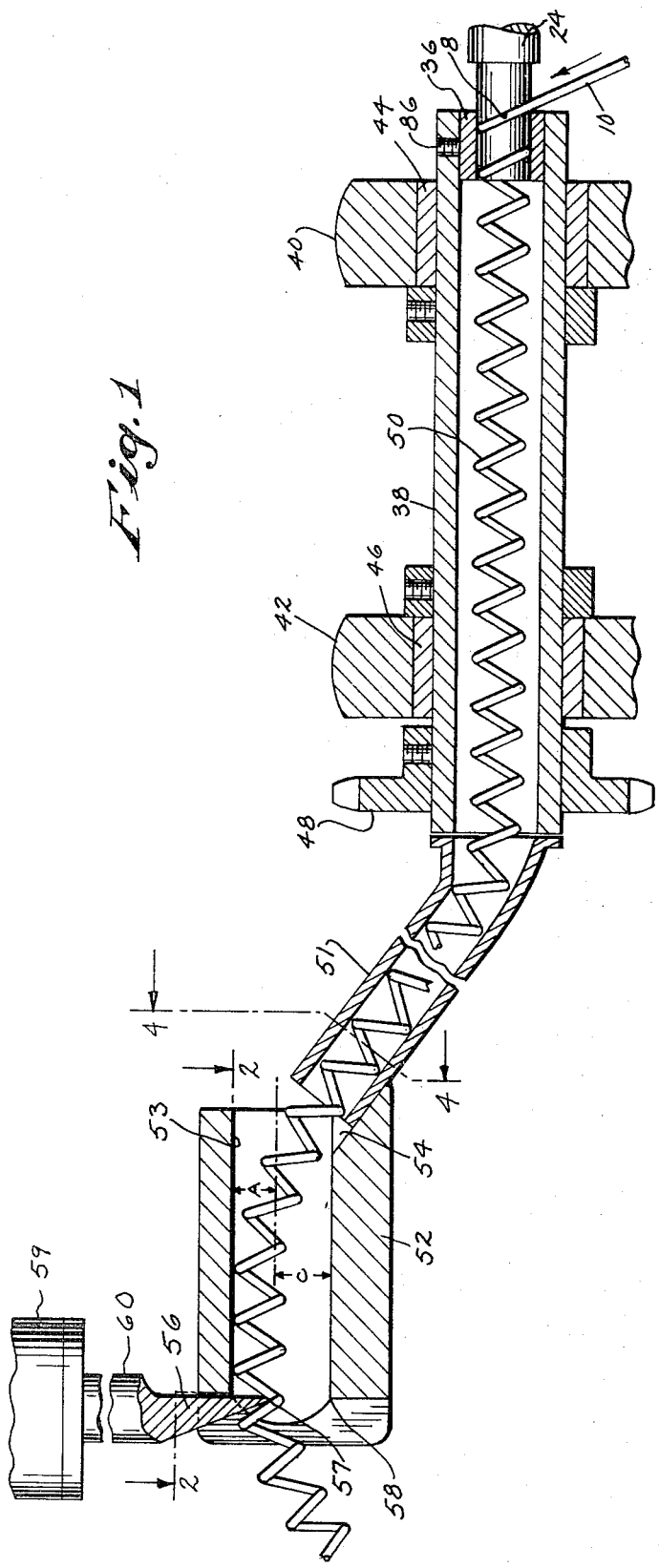
FIG. 1 is a fragmentary, longitudinal, vertical, sectional view showing a portion of the coiling mechanism of U.S. Pat. No. 3,736,784, and showing a newly-formed coil being delivered to the novel shearing apparatus of the present invention, the shear being in retracted position, parts being broken away.

Referring more particularly to the drawing, the numeral 24 designates the fixed mandrel of the roller die coiler of my prior U.S. Pat. No. 3,736,784. Here the wire 10, which is to form the coil, is suitably directed to the proper place in the beginning of the helical groove 8 of the fixed mandrel. The rotatable die member 36 is removably secured within the end of the sleeve 38 by a set screw 86. This rotatable die 36 engages the wire 10 in the helical groove 8 and forces the wire into a permanent coil shape. As fully explained in my prior patent, the wire is of a diameter to project slightly beyond the groove. The hollow sleeve 38 is journalled in supporting frames 40 and 42 having bearings 44 and 46. The rotatable die member 36 and the sleeve 38 are rotated together by means of rotary power applied thereto by a suitably driven sprocket 48. The fixed mandrel 24 has a minimum of one convolution of the helical groove 8 and has a width and depth sufficient to substantially accommodate the diameter of the wire, with a very slight projection of the wire from the top of the groove 8. In use of the coiling apparatus, the rotational movement of the die is at the same speed as the lineal speed of the wire, and friction between the die and wire is substantially eliminated. Because there is a slight clearance between the periphery of the mandrel and the ID of the roller die, friction between these two parts is also substantially eliminated, the wire projecting slightly beyond the grooves. The movement of the wire through the die is caused by the feed movement of the wire in conjunction with the rotating movement of the die as fully explained in the patent. The result is that the wire is discharged from the coiler in the form of the coil 50, with the coil traveling at high speed and with the coil rotating. In the apparatus just described, assuming that a ⅜ inch OD coil is being made, the coil is rotating at approximately 5,000 r.p.m. and the machine is delivering coils at a speed in the neighborhood of 2 ft. per second. The present invention can be adapted to any convenient production speed.

While the present invention is particularly suited for use in shearing coils produced by the coiler of my prior U.S. Pat. No. 3,736,784 as just described, it is to be understood that the improved shearing apparatus of the present invention is adapted for use in the shearing of helical coils delivered from other types of coiling apparatus as long as the delivered coil is being moved lineally and also being rotated.

Referring again to FIG. 1, the newly-produced coil is continuously delivered into a stationary guide tube 51 which extends upwardly at a predetermined angle with its upper end overlapping the end of a guide tunnel 52. The entrance end of the guide tunnel has a lower flared portion 54 in which the upper end of the guide tube is seated. The guide tunnel is preferably disposed horizontally. In any event, the angle which the guide tube makes with respect to the axis of the guide tunnel 52 is such as to provide sufficient spring action of the coil against the upper portion of the wall of the bore 53 of the guide tunnel, so that the spring characteristics of the coil tend to normally keep the coil in engagement with the upper portion of the bore as shown in FIG. 1.

Figure 2:
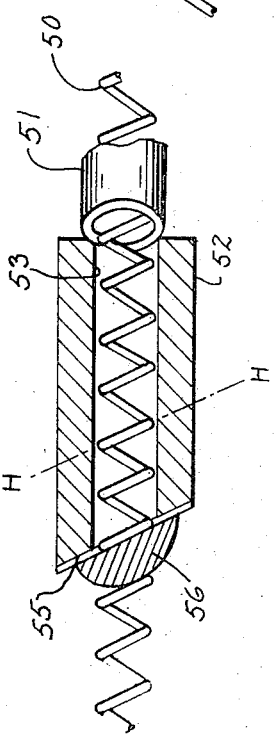
FIG. 2 is a fragmentary sectional view taken approximately on the line 2—2 of FIG. 1.

In plan view, as shown in FIG. 2, the discharge end of the tunnel is cut on an angle as at 55, with the angle at 55 being substantially the same as the helical angle H of the coil being sheared. Suitably supported for shearing movement adjacent the discharge end of the guide tunnel is a shearing knife 56 having a shearing edge 57 for coaction with a fixed shearing edge 58 at the lower portion of the discharge end of the tunnel. Said knife is adapted to be operated in any well-known manner by a fluid pressure operated cylinder 59 having an extensible ram 60, to the lower end of which the knife is attached. It is preferred to employ a pneumatic cylinder. The operation of the control valve for the fluid pressure cylinder 59 may be under the control of a solenoid in an electric eye circuit, as is well known in the art, the electric eye circuit being arranged to operate the ram to cause cutting off of the coil at predetermined length intervals.

Figure 4:
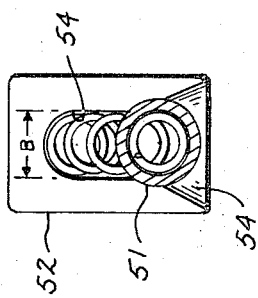
FIG. 4 is a sectional view taken on the line 4—4 of FIG. 1.

The bore 54 of the tunnel is elongated in shape and has a dimension B (FIG. 4) which is slightly greater than the outside diameter of the coil to be handled. In other words, dimension B should be equal to the outside diameter of the coil plus relief tolerances sufficient to allow the coil to spring up and down in the oval bore 54. Dimension A (FIG. 1) preferably should not exceed the OD of the coil minus the thickness of the strand of the wire stock. When the shearing knife is in retracted position as in FIG. 1, its shearing edge 57 projects into overlapping relationship with the bore 54 of the tunnel an amount substantially equal to dimension A. Dimension C of FIG. 1 is the OD of the coil plus a tolerance. The height of the tunnel bore 54 is therefore equal to A plus C. While these dimensional relationships are desirable for efficient operation, they may vary to some degree from the precise relationships just discussed, as long as the relationships are such as to create the desired results, as will be hereinafter explained.

In use of the shearing device, as the coil 50 is being fed at high speed and rotated simultaneously, it rotates past the knife 56 while in threaded engagement therewith, as shown in FIG. 1, with high speed movement. As before explained, the angle of the guide tube with respect to the tunnel bore 54 is such that the springiness of the coil naturally urges the coil to the position of FIG. 1 in engagement with the overlapping knife 56. It is thus apparent that the position of the knife as shown in FIG. 1 is always such that, in shearing action, it will be engaged with a lower portion of a convolution to eliminate any possibility of the shear knife coming down on the top of a convolution to crush and deform the coil. Accordingly, when a cutting stroke is called for by the electric eye, the fluid pressure operated cylinder 59 will cause the ram 60 to extend to move the knife to the shearing position of FIG. 3 where it coacts with the fixed shearing edge 58 to shear the lower portion of a convolution in a precise location, which will provide accurate lengths of coil.

Figure 3:
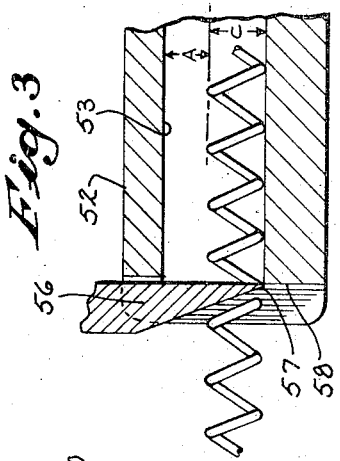
FIG. 3 is a view of the shearing portion of the apparatus of FIG. 1 showing the shear knife performing a shearing operation.

During the shearing stroke shown in FIG. 3, there will be a momentary stopping of coil movement behind the knife. With the coiling machine of my prior patent, assuming that the ⅜ inch OD coil heretofore described is being produced at the speeds heretofore described, approximately 1 inch additional of coil is being produced while the knife is in the position of FIG. 3. Due to the inherent springiness of the coil, however, the coil compresses behind the knife so that the extra length is temporarily absorbed by the coil itself. Inasmuch as the knife action is very fast, the knife will immediately retract to the position of FIG. 1. As soon as the knife releases from the coil, the compression will be relieved and the coil will spring out and up into re-engagement with the retracted knife, as in FIG. 1. A new length of coil will then be threadedly advanced beyond the knife and, at a predetermined time, as determined by the electric eye, another shearing stroke as in FIG. 3 will be made.

It is apparent from the above that the improved apparatus and method provides for shearing a helical coil which is being continuously moved and rotated at high speed. It is also apparent that the arrangement is such that the retracted knife is always in a predetermined relationship with a lower portion of a coil so that it is always ready to perform an accurate cut on a lower convolution portion, with all danger of crushing engagement with a top of a convolution eliminated. It is also to be noted that the natural spring characteristics of a coil are employed in a novel way to absorb compression during the shearing stroke, and also to cause re-engagement of the coil with the retracted knife.

Various changes and modifications may be made without departing from the spirit of the invention, and all of such changes are contemplated as may come within the scope of the following claims.

What I claim is:

1. Apparatus for shearing a helical coil, which is being moved lineally and which is being simultaneously rotated about its axis, comprising shearing means including a fixed shearing edge and a movable shearing knife having a shearing edge, means for guiding said coil toward said shearing knife at an oblique angle with respect to the direction of movement of said knife, guiding means for changing the angle of movement of said coil so as to store energy in the coil as a result of said change, said last guiding means being positioned to guide the coil into threaded engagement with said shearing knife while the latter is retracted, with said stored energy of the coil urging the coil in said threaded engagement with the retracted knife, and means for moving the shearing knife while in threaded engagement with the coil into shearing relationship with said fixed shearing edge to shear the coil without crushing.

2. Apparatus as set forth in claim 1 in which there is means for supporting the shearing knife so that its shearing edge is disposed at substantially the angle of the convolutions of the coil.

3. Apparatus for shearing a helical coil which is being moved lineally and which is being simultaneously rotated about its axis comprising a guide tunnel having a bore with inlet and discharge ends, said bore having at least one cross-sectional dimension which is substantially greater than the OD of the coil, a shearing knife having a shearing edge, means for movably supporting said knife adjacent the discharge end of the guide tunnel bore so that, when the knife is in retracted position, a potion with said shearing edge projects into overlapping relationship with a wall portion of the bore of the tunnel at one end of said greater cross-sectional dimension a distance substantially less than said greater cross-sectional dimension of the bore, said guide tunnel having a fixed shearing edge positioned opposite the shearing edge of the knife, means for guiding the coil into the bore of the guide tunnel to a position where it is in threaded engagement with the projecting portion of the knife so that, when the knife is retracted, the coil advances beyond the knife while in threaded engagement therewith, and means for producing a shearing stroke of said knife to move the coil, while in threaded engagement with the knife, into shearing relationship with said fixed shearing edge of the guide tunnel to thereby shear the coil without crushing.

4. Apparatus as claimed in claim 3 in which the shearing knife is so supported that its shearing edge is at substantially the angle of the convolution of the coil.

5. Apparatus as claimed in claim 3 in which the retracted shearing knife projects into overlapping relationship with the bore a distance no greater than the OD of the coil minus the thickness of the wire forming the coil.

6. Apparatus as claimed in claim 5 in which said greater cross-sectional dimension of the bore is at least twice the OD of the coil minus the thickness of a strand of wire forming the coil.

7. Apparatus as claimed in claim 3 in which the means for guiding the coil into the bore comprises a guide tube disposed at such an angle with respect to the inlet end of the guide tunnel that the springiness of the coil urges the coil into contact with that wall portion of the guide tunnel bore which is overlapped by the shearing knife.

8. Apparatus as claimed in claim 3 in which the tunnel bore has upper and lower portions, and in which the greater dimension of the bore is a height dimension, and in which the retracted knife overlaps the upper portion of the bore with the fixed shearing edge being adjacent a lower portion of the bore of the tunnel.

9. Apparatus as claimed in claim 3 in which the bore of the tunnel is elongated in cross section, having a width slightly greater than the OD of the coil and having said greater cross-sectional dimension measured at right angles to said width dimension.

10. A method of shearing a helical coil which is being moved lineally and which is being simultaneously rotated about its axis comprising guiding said coil toward a shearing knife at an oblique angle with respect to the direction of movement of said shearing knife, changing the angle of movement of said coil so as to store energy in the coil as a result of said change, and guiding the coil into threaded engagement with said shearing knife while the latter is retracted while allowing said stored energy of the coil to maintain the coil in said threaded engagement, and moving the shearing knife while in threaded engagement with the coil into shearing relationship with a fixed shearing edge to shear the coil without crushing.

* * * * *